J. H. MACKE, Jr.
FOLDING MUSIC STAND.
No. 10,947. Reissued July 24, 1888.
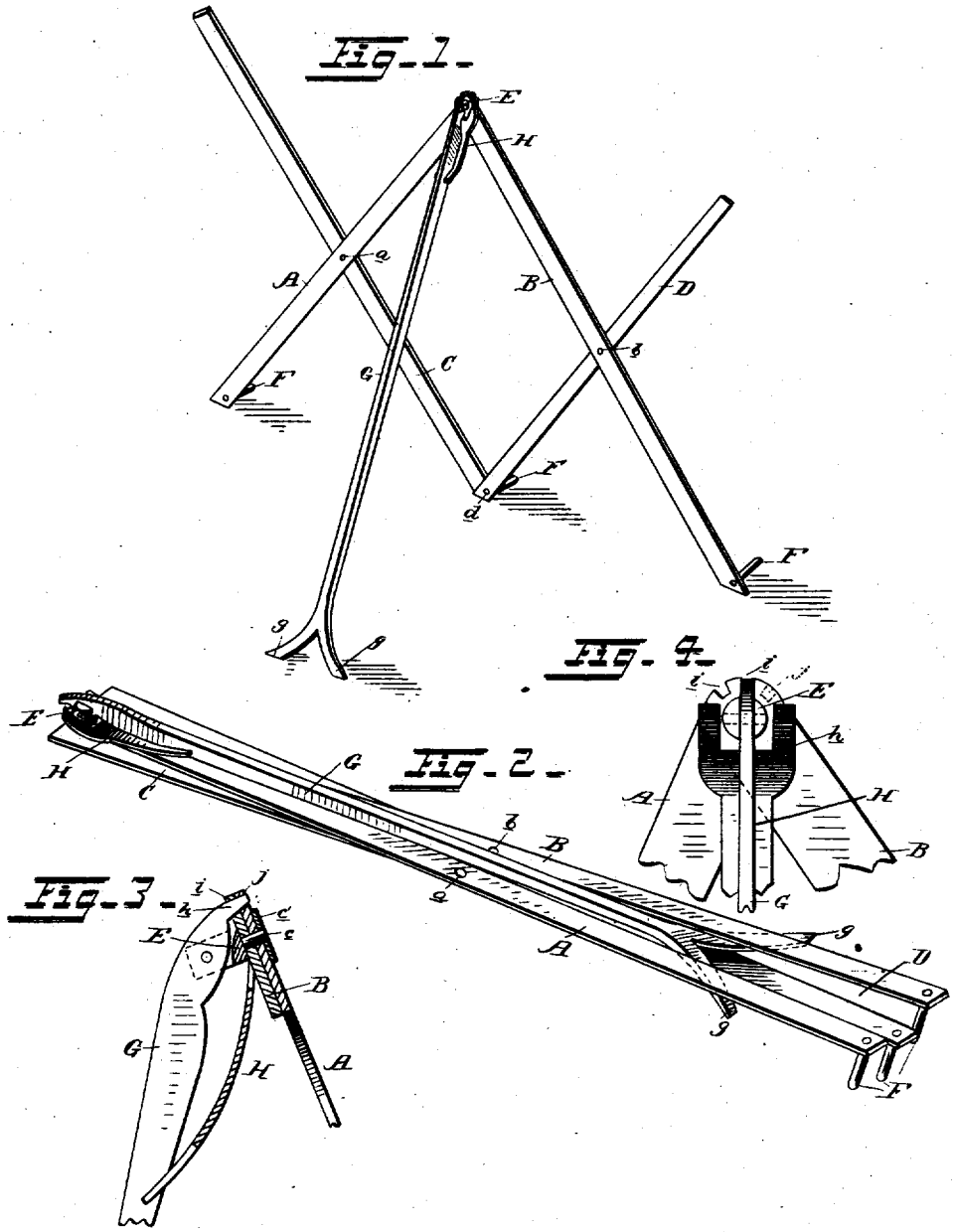
WITNESSES:
W. T. Robertson.
Thos. E. Robertson.
INVENTOR.
J. Henry Macke, Jr.
BY T. J. W. Robertson,
ATTORNEY.
N. PETERS, Photo-Lithographer, Washington, D. C.

UNITED STATES PATENT OFFICE.

J. HENRY MACKE, JR., OF BALTIMORE, MARYLAND.

FOLDING MUSIC-STAND.

SPECIFICATION forming part of Reissued Letters Patent No. 10,947, dated July 24, 1888.

Original No. 377,629, dated February 7, 1888. Application for reissue filed April 10, 1888. Serial No. 270,224.

*To all whom it may concern:*

Be it known that I, J. HENRY MACKE, Jr., of Baltimore, in the State of Maryland, have invented certain new and useful Improvements in Folding Music Stands; and I do hereby declare the following is a full, clear, and exact description of the invention, that will enable others skilled in the art to which it appertains to make and use the same, reference being had to the accompanying drawings, and to the letters of reference marked thereon, which form a part of this specification.

My invention relates to improvements in folding music-stands; and it consists of the novel construction, combination, and arrangement of devices, as will be hereinafter fully described, and particularly pointed out in the claims.

In the accompanying drawings, Figure 1 is a perspective view of my improved music-stand in an unfolded position and adjusted for use. Fig. 2 is a like view of the stand folded together. Fig. 3 is a detail sectional view of the connection of the lazy-tongs and supporting-leg, and Fig. 4 is a rear elevation of the same.

Referring to the drawings, in which like letters of reference denote corresponding parts in all the figures, A B C D designate the links, which cross one another in the manner shown, and are pivotally connected at their middles, as at *a b*, to form lazy-tongs, and the upper extremities of the links A B are pivoted together, as at *c*, by means of a stud, E, which has a reduced neck that passes through the lapped meeting ends of the links A B, and is beaded down upon a washer, *c'*. The lower extremities of the links C D are pivotally connected together, as at *d*, and the pivoted lower ends of said links and the free corresponding ends of the links A B are provided with ledges F, which are disposed nearly at right angles to the links and in line with each other when the stand is unfolded for use, to thereby form a shelf on which the sheet of music, &c., rests.

G designates a self-adjusting supporting-leg, which is arranged in rear of the links, and forms with them a tripod support. This leg is pivotally secured at its upper extremity to the stud E, the leg being fitted in a notch cut in the stud and hung on a suitable pin that is fixed in the stud. The lower extremity of the supporting-leg is provided with feet *g*, which are adapted to take firm hold upon the object upon which the stand is placed to prevent the latter from slipping or becoming displaced, and these feet extend laterally from the leg, on opposite sides thereof, so that they can press or bear against the front lateral faces of the links A B when the parts are folded together, in the manner presently described.

To render the supporting-leg self-adjusting when the stand is unfolded for use, I provide a spring, H, which is so arranged as to automatically press the leg into position for holding the stand upright when it is unfolded for use. The lower end of this spring is fixed to the supporting-leg at a point below its pivot, and the upper free end of the spring impinges or bears against the rear side of the pivoted ends of the links A B, said free end of the spring being preferably bifurcated, as at *h*, to adapt it to fit around the stud E.

The upper pivoted ends of the links A B are provided in their edges with a series of notches, *i j*, respectively, which are adapted to align or register when the lazy-tongs are spread apart, so that a nib or shoulder, *k*, on the supporting-leg can fit into the notches to prevent the lazy-tongs from movement. The nib or shoulder *k* is formed on the extreme upper end of the pivoted leg, above the pin on which the leg is hung, and the nib projects forward beyond the leg, so that when the lower end of the leg is forced rearward of the lazy-tongs by the spring the nib or shoulder on the upper end of the leg is pressed forward to take into the aligned notches of the links A B, to prevent the lazy-tongs from spreading farther than the distance to which they have previously been adjusted.

The operation of my invention will be readily understood. To fold the music-stand within a very small space, the lazy tongs are pressed toward each other, and at the same time the leg is forced forward toward the lazy-tongs, to withdraw the nib or shoulder *k* from the notches and cause the laterally-extending feet to lie in advance of the lower ends of the links C D, and the links are then forced together, and the feet of the leg are pressed by the spring against the front lateral faces of the lower extremities of the links C D, whereby the leg is locked in place. To unfold the stand, it is only necessary to pull the links outward the desired distance to thereby free the feet from contact with the links C D, and the spring forces the lower end of the leg rearward, to adapt the feet thereof to rest upon the table, &c., and to cause the nib or shoulder *k* to enter the notches of the links A B.

I do not desire to confine myself to the exact details of construction and form and proportion of parts herein shown and described as an embodiment of my invention, as I am aware that changes therein can be made without departing from the principle of my invention.

I deem it important that the leg be connected near the top of the system of levers or lazy-tongs, for by this means I am enabled to form my lazy-tongs or frame of four levers only, whereas if the leg were pivoted in the middle of its height, as has been proposed, not less than six levers would be necessary. Moreover, if an attempt were made to make a folding music stand of the same character as mine with a leg pivoted to the center of its height, the leg would necessarily be so short as to render the stand very unstable, as, owing to the shortness of the leg, it could not extend very far in the rear of the frame. It will thus be seen that the construction shown in the drawings has two important advantages that it could not have if the leg were connected to the center of its height—viz , lightness and stability.

Another important feature of my stand may be noticed which clearly distinguishes it from other constructions of stands that have been proposed, which is the fact that two of my levers form with the leg a tripod which supports the stand in its normal position in use. Said two levers thus perform the double function of serving to support the music in an open position, and at the same time act as part of the tripod, and thus there is no necessity for a separate base in addition to the levers, as has been proposed.

Having thus fully described my invention, what I claim as new, and desire to secure by Letters Patent, is—

1. A folding music-stand comprising a system of pivoted levers forming a support for the music and a leg connected at the junction of two of the levers, and forming with said levers a tripod to support the same, whereby the levers perform the double function of supporting the music and act as legs for the stand, substantially as described.

2. A folding music-stand comprising a system of pivoted levers, a pivoted leg connected to the top joint of the same and forming with said levers a tripod support, and a holder, as the spring H, for keeping the leg in the open position, substantially as described.

3. A folding music-stand consisting of the lazy-tongs, a leg pivoted near the top and forming with two members of said lazy-tongs a tripod support for holding the same in an inclined position, and the spring H, for forcing the leg rearward as the lazy-tongs are separated, as and for the purpose described.

4. A folding music-stand consisting of the lazy-tongs, a supporting-leg pivotally connected with the tongs at its top joint and forming with two members of said lazy-tongs a tripod support, and adapted to fold against said lazy-tongs and to be locked thereto, and a spring interposed between the leg and lazy-tongs for forcing the leg away from the tongs when the latter are separated to release the leg, as and for the purpose described.

5. A folding music-stand consisting of the notched lazy-tongs, a supporting-leg pivotally connected to the lazy-tongs, and having a nib or shoulder adapted to enter the notches of the lazy-tongs to prevent the same from spreading, and a spring for forcing the lower end of the leg away from the lazy tongs, substantially as described.

6. A folding music-stand consisting of the pivoted links A B C D, a stud, E, connected to the meeting end of the links A B, a leg pivoted to the stud, and having a projecting nib, *k*, at its extreme upper end above the pivot-pin, adapted to enter one of a series of notches in the links A B, and a spring for forcing the lower end of the leg away from the tongs, as and for the purpose described.

In testimony whereof I affix my signature in presence of two witnesses.

J. HENRY MACKE, JR.

Witnesses:
MURRAY HANSON,
WILLIAM H. BERRY.